United States Patent [19]

Mede

[11] 4,314,725
[45] Feb. 9, 1982

[54] RING DAMPED COMPOSITE TRANSIT WHEEL

[75] Inventor: John J. Mede, Lewistown, Pa.

[73] Assignee: Titanium Metals Corporation of America, Pittsburgh, Pa.

[21] Appl. No.: 124,180

[22] Filed: Feb. 25, 1980

[51] Int. Cl.³ .............................................. B60B 17/00
[52] U.S. Cl. ...................................................... 295/11
[58] Field of Search ..................... 295/7, 8, 11, 15, 18, 295/21, 23, 30, 36 R, 36 A, 37, 43

[56] References Cited

U.S. PATENT DOCUMENTS 3,127,211  3/1964  Korjes et al. ........................... 295/11
3,334,886  8/1967  Caunt ...................................... 295/11

Primary Examiner—Richard A. Bertsch
Attorney, Agent, or Firm—John K. Williamson

[57] ABSTRACT

A transit wheel is disclosed comprising a body having a bore through the center thereof, a hub about the bore extending through a web to an outer portion, and an annular rim having a circular inside surface disposed against a circular outside surface of the outer portion. The inside surface of the annular rim and the outside surface of the outer portion are each provided with a circumferential groove, which grooves are substantially aligned when the annular rim is disposed against the outer portion. The transit wheel further includes a damping rod formed into a ring and disposed within the aligned grooves, with the ring traversing at least 95% of the circumference of the groove.

8 Claims, 2 Drawing Figures

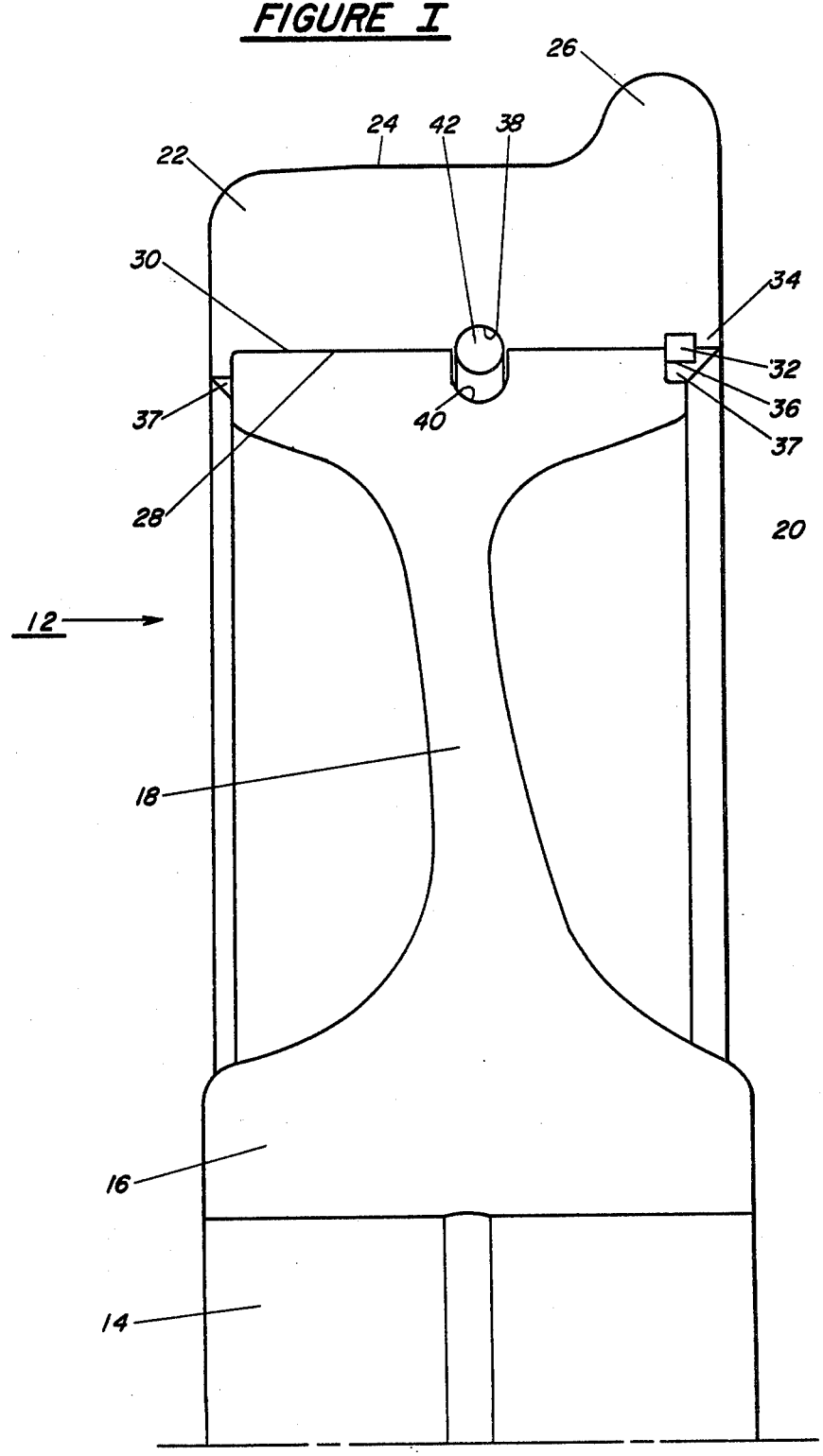

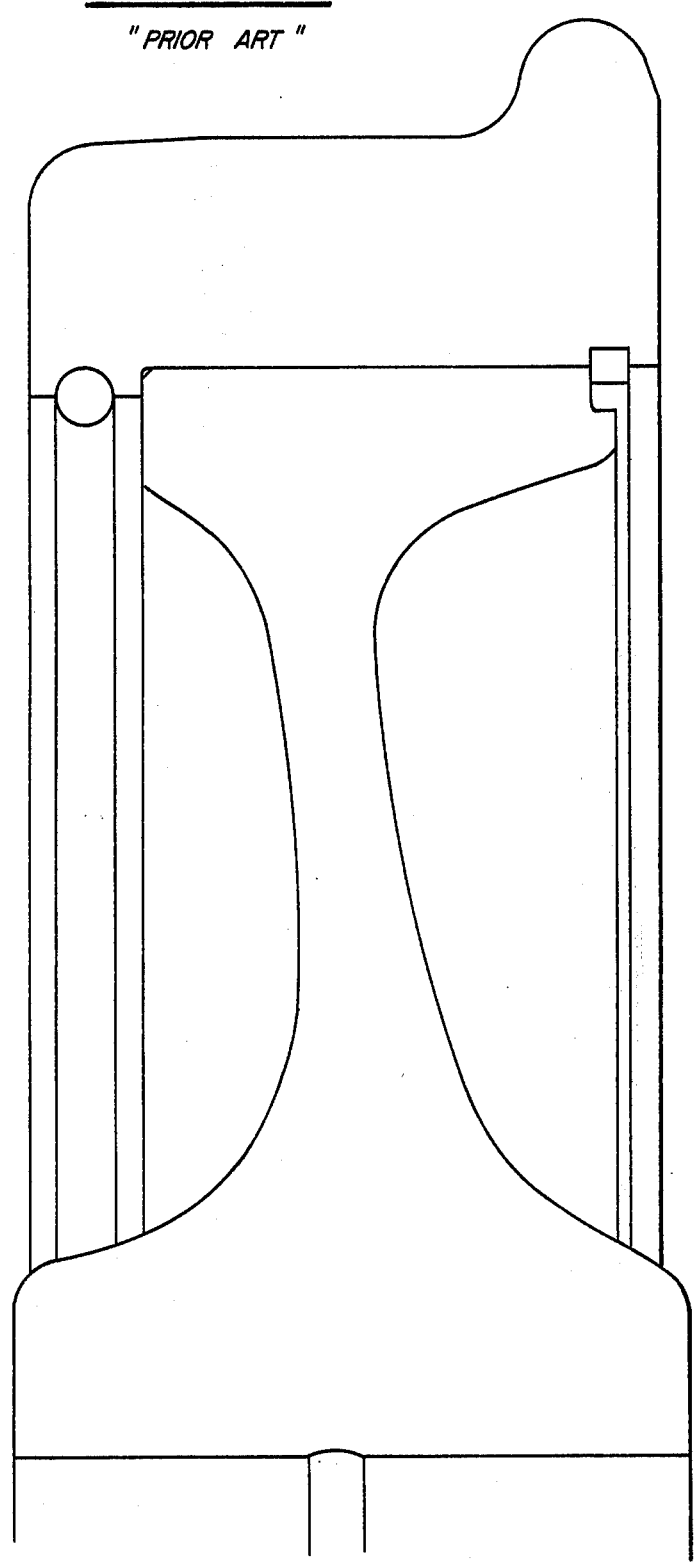
FIGURE II
"PRIOR ART"

RING DAMPED COMPOSITE TRANSIT WHEEL

BRIEF SUMMARY OF THE INVENTION

The present invention relates to transit wheels and, more particularly, to a ring damped composite transit wheel.

Lightweighting is a continuing objective for the transportation industry as a means for reducing overall energy requirements. It is readily apparent that less energy is required as the weight of the body to be moved is reduced. As a result, significant reductions in weight have been attempted and realized throughout the industry.

One particular area of weight reduction has been the substitution of low density parts for high density parts. Emphasis on lightweight substitutions have resulted in increased use of aluminum and plastics as a reduction in the amount of heavier materials, such as steel.

Lightweighting, by substitution of lighter materials, has found success in the transit wheel design and manufacture. As used in the present application, transit wheels generally include all wheels designed and adapted to ride on a rail, and more particularly include wheels designed for lightweight communicator service. For years, transit wheels have been constructed entirely of steel. Only recently have transit wheels been constructed of an aluminum center and an outer tire or rim, of steel. The harder and more wear resistant steel rim is necessary in order to maintain significant wheel life. It is apparent that the tread of an aluminum rim would not last as long as a steel rim when exposed to significant wear conditions in service against a rail.

Composite transit wheels, i.e., those manufactured with a rim separate from the center, have been in service for many years. It has been found that significant vibrations occur, in service, in the rim and the center of a composite transit wheel. In order to decrease and perhaps eliminate such vibrations attempts have been made to provide damping devices about the composite transit wheel.

Prior attempts to reduce vibration have included the insertion of a damping ring in an external groove provided in the inside surface of the rim. Such prior art damping ring is illustrated in FIG. 2 of the drawing of the present specification. Such damping ring location follows the general teachings of U.S. Pat. Nos. 2,605,132 and 3,080,771. Alternative damping devices are disclosed in U.S. Pat. Nos. 1,765,477; 1,813,820; 2,650,853; 2,659,622; 2,853,337; 2,954,259; 2,923,570; 3,127,211 and 3,756,646.

Various disadvantages have been found in using externally fitted damping rings. For example, such external rings are not protected from the weather conditions including road salt, and are subject to rusting, corrosion and accumulations of dirt and debris all of which could inhibit the free movement and natural vibration of the ring. External rings are vulnerable to vandalistic, accidental or deliberate tampering or removal. Also, dislodgement of an external ring could have serious consequences to personnel or adjacent equipment upon release of such compressed ring from its compressed state. It is also significant that the location of an external damping ring affects the amount of support offered and provided for the separate rim of the transit wheel. For the prior art structure illustrated in FIG. 2, the amount of support lost to the mounting of the external damping ring is a significant portion of the supporting surface. Loss of such rim support may create high stress patterns in the unsupported area of the rim during service which may adversely affect wheel wear and wheel life, and may create an unsafe condition.

Accordingly, an alternative ring damped composite transit wheel is desired in which the damping ring is protected from environmental and other external conditions and which also provides adequate support for the separate rim of the transit wheel.

The present invention may be summarized as providing a transit wheel comprising a body having a bore through the center thereof, a hub about the bore extending through a web to an outer portion and an annular rim disposed against the outer portion. An inside surface of the annular rim and an outside surface of the outer portion are each provided with a circumferential groove, which grooves are substantially aligned when the annular rim is disposed against the outer portion. The transit wheel further comprises a damping rod formed into a ring and disposed within the aligned grooves, with the ring traversing at least 95% of the circumference of the groove.

An objective of the present invention is to provide a transit wheel having a damping ring which is totally enclosed and thus protected from weather, corrosion, rust and other accumulations which could inhibit the free movement and natural vibration of the damping ring.

A further advantage of the present invention is the provision of a transit wheel wherein the edges of a steel rim of the wheel are sealed against moisture and corrosion. By such construction, rust and corrosion products cannot decrease the electrical conductivity between the steel rim and the aluminum center of the wheel.

Another objective of the present invention is to provide a transit wheel having a damping ring which cannot be accidentally or inadvertently removed from the transit wheel.

An advantage of the present invention is that a transit wheel is provided which has a damping ring and yet the central portion of the transit wheel provides support for the separate annular rim on both sides of the damping ring.

These and other objectives and advantages of this invention will be more fully understood and appreciated with reference to the following detailed description and the drawings appended hereto.

BRIEF DESCRIPTION OF THE DRAWINGS

FIG. 1 is a partial cross-sectional view of a transit wheel of the present invention.

FIG. 2 is a partial cross-sectional view of a prior art transit wheel.

DETAILED DESCRIPTION

Referring particularly to the drawings, FIG. 1 illustrates a partial cross-sectional view of a preferred transit wheel of the present invention. As is typical, the illustrated transit wheel includes a generally disk-shaped body 12. The body 12 has a bore 14 through the center thereof typically provided for the insertion of the wheel onto an axle. About the central bore 14 is a hub 16 extending through a web 18 to an outer portion 20. The web 18 typically has a reduced cross-sectional thickness and a greater length with respect to the hub 16 and the outer portion 20. In a preferred embodiment, the body portion 12 is integrally constructed of an aluminum alloy, such as Aluminum Association Alloy 6061-T6, and manufactured as a closed die forging. Alternatively, the body portion 12 may be constructed of forged or cast steel.

The transit wheel further includes a separate annular rim 22 having an external tread surface 24 and an outwardly extending flange 26 projecting from the inside edge thereof with respect to the inside area between a pair of rails when a pair of transit wheels are mounted onto an axle for service.

The annular rim 22 is provided with a circular inside surface 28 which is generally planar in cross section as illustrated in FIG. 1. The inside surface 28 of the annular rim 22 is disposed against, and thus supported by, a circular outside surface 30 of the outer portion 20, which surface 30 is also generally planar in cross section as illustrated in FIG. 1. It is understandable that such surfaces 28 and 30 may have to be machined to assure substantial contact along the interface therebetween, which may be necessary to provide adequate surface support therebetween. As is conventional for composite structures of the type disclosed herein, a retaining ring 32 may also be provided near the inside edge at the interface of surfaces 28 and 30. Also, a lip 34 may be provided along the outside edge of the rim 22 which may project into a recess 36 in the outer portion 20 to aid in properly seating the rim 22 against the outer portion 20.

In a preferred embodiment, a sealant 37 may be provided in such recess 36 and in the retaining ring recess defined by groove 38 to protect the area of interface between the outer portion 20 and the rim 22, as well as the damping ring 42, from moisture and corrosion. Such sealant also insures that good electrical conductivity is maintained between the rim 22 and the body 12 during service.

In accordance with the present invention, the inside surface 28 of the annular rim 22 and the outside surface 30 of the outer portion 20 are each provided with a groove, 38 and 40, respectively, therein. In a preferred embodiment the grooves 38 and 40 are generally semicircular in cross section. It should be understood, however, that such grooves may have various configurations such as rectangular, square, polygonal and ovular.

The grooves 38 and 40 are substantially aligned when the inside surface 28 of the annular rim 22 is disposed against the outside surface 30 of the outer portion 20. Furthermore, at least a portion of the surfaces 28 and 30 on both sides of such aligned grooves 38 and 40 are disposed against one another. By such construction, the outer portion 20 provides support for the annular rim 22 on both sides of the aligned grooves 38 and 40. In a preferred embodiment, particularly on wheels having relatively narrow tires (i.e. width less than five inch), at least a portion of the aligned grooves lies within the center line of the rim 22, as shown in FIG. 1.

To provide the required damping mechanism for the transit wheel of the present invention, a damping rod is formed into a ring 42 and is disposed within the aligned grooves 38 and 40 and lightly fits against the rim 22. Such ring 42 should traverse at least about 95% and more preferably at least about 98% of the circumference of the aligned grooves 38 and 40. In a preferred embodiment, the damping ring 42 is a metallic, such as a steel or other ferrous or non-ferrous metal rod, and is preferably circular in cross section. It will be appreciated by those skilled in the art that the ring 42 may be constructed of various materials, and may have a multitude of cross-sectional configurations. However, the shape and configuration of the aligned grooves 38 and 40 should conform substantially to the shape and configuration of the damping ring 42 in order to maximize the vibration damping qualities and characteristics of the ring 42.

Also, the aligned grooves 38 and 40 should form an aperture in the composite transit wheel of the present invention which has a radial extent greater than the radial extent of the damping ring 42. Such construction allows the damping ring 42 to move inwardly of the transit wheel to absorb vibration and to permit assembly of the wheel. Further, the ring 42 should not be attached to the rim 22 or to the outer portion 20 of the body of the transit wheel at any location about the circumference of the aligned grooves 38 and 40. In this respect, the ring 42 will be able to respond to any vibrations and to move as may be required to adequately absorb vibration at any location about the circumference of the transit wheel.

To assemble a transit wheel, such as that illustrated in FIG. 1 comprised of an aluminum body 12 and a steel rim 22, the rim 22 is first heated, such as to a temperature of about 450° F. causing the rim 22 to expand to a larger inside diameter as defined by the inside surface 28. Before heating, the inside diameter of the rim 22 as defined by the inside surface 28 is slightly smaller than the outside diameter of the body 12 as defined by the outside surface 30 of the outer portion 20. With the rim 22 expanded by the heat, the damping ring 42 is compressed into a smaller diameter and placed into the groove 40 of the outer portion 20. The body 12 is placed inside the expanded rim 22 such that the grooves 38 and 40, with the damping ring 42 therein, are in substantial alignment. Then, the rim 22 is cooled, causing contraction thereof, and the retaining ring 32 is installed resulting in the assembly of a ring damped composite transit wheel of the present invention. It should be noted that when the rim 22 cools to ambient temperature, there is a very tight fit between the body 12 and the rim 22 with approximately 0.035 inches diametral interference.

Whereas the preferred embodiments of the present invention have been described above for the purposes of illustration, it will be apparent to those skilled in the art that numerous variations of the details may be made without departing from the invention.

I claim:
1. A transit wheel comprising:
 a generally disk-shaped metallic body having a bore through the center thereof, a hub about the bore extending through a web to an outer portion, said web having a reduced cross-sectional thickness with respect to the hub in the outer portion,
 a separate metallic annular rim having a circular inside surface, generally planar in cross section, disposed against a circular outside surface, generally planar in cross section, of the outer portion,
 said inside surface of the annular rim and said outside surface of the outer portion each provided with a circumferential groove, which grooves are substantially aligned when the inside surface of the annular rim is disposed against the outside surface of the outer portion, and
 a rigid damping rod formed into a ring and disposed within the aligned grooves in the inside surface of the annular rim and the outside surface of the outer portion, said ring traversing at least about 95% of the circumference of the aligned grooves.

2. A transit wheel as set forth in claim 1 wherein the disk-shaped body is aluminum.

3. A transit wheel as set forth in claim 1 wherein the annular rim is steel.

4. A transit wheel as set forth in claim 1 wherein a retaining ring is provided at the interface of the inside surface of the annular rim and the outside surface of the outer portion.

5. A transit wheel as set forth in claim 1 wherein the damping ring is generally circular in cross section.

6. A transit wheel as set forth in claim 1 wherein at least a portion of the aligned grooves lies within the center line of the rim.

7. A transit wheel as set forth in claim 1 wherein the rim is provided with an outer peripheral flange projecting outwardly from one lateral edge thereof.

8. A transit wheel as set forth in claim 1 wherein a sealant is provided in circumferential recesses located in the circular inside surface and in the circular outside surface at the interface of the rim and the body.

* * * * *